United States Patent [19]
Van Erden et al.

[11] Patent Number: 5,837,349
[45] Date of Patent: Nov. 17, 1998

[54] METHOD AND APPARATUS FOR PRODUCING ORIENTED PLASTIC STRAP, AND STRAP PRODUCED THEREBY

[75] Inventors: Donald L. Van Erden, Wildwood; Manuel C. Enriquez, Morton Grove, both of Ill.

[73] Assignee: Illinois Tool Works Inc., Glenview, Ill.

[21] Appl. No.: 696,541

[22] Filed: Aug. 14, 1996

Related U.S. Application Data

[60] Division of Ser. No. 474,355, Jun. 7, 1995, Pat. No. 5,660,787, which is a continuation-in-part of Ser. No. 353,721, Dec. 12, 1994, Pat. No. 5,525,287, which is a continuation-in-part of Ser. No. 958,803, Oct. 9, 1992, Pat. No. 5,387,388.

[51] Int. Cl.$^6$ ........................................................ B32B 9/00
[52] U.S. Cl. ........................... 428/192; 428/37; 428/111; 428/147; 428/220; 428/337; 428/409; 425/66; 425/224; 425/296; 425/363; 264/280; 264/288.4; 219/165; 219/175; 219/210.5
[58] Field of Search ............................. 428/37, 111, 192, 428/337, 220, 147, 409, 411.1; 425/363, 224, 66, 296, 174.4; 204/280, 288.4; 264/280, 288.4; 219/165, 175, 210.5

[56] References Cited

U.S. PATENT DOCUMENTS 5,387,388 2/1995 Van Erden et al. .................... 264/280
5,597,640 1/1997 Van Erden et al. .................... 428/192

*Primary Examiner*—William Krynski
*Assistant Examiner*—Abraham Bahta
*Attorney, Agent, or Firm*—Schwartz & Weinrieb

[57] ABSTRACT

An apparatus and method for producing an oriented plastic strap having a predetermined desired thickness and flatness characteristics for use in connection with the strapping of packages or the like, is disclosed. A sheet workpiece is conducted into a nip defined between a pair of opposed milling and stretching rollers wherein one of the rollers is rotated at a lineal surface velocity which is greater than the lineal surface velocity of the other roller, and the rollers are rotated in opposite directions. One of the rollers effectively brakes or retards one of the surfaces of the sheet workpiece while the other one of the rollers effectively accelerates the other one of the surfaces of the sheet workpiece as the workpiece passes through the nip defined between the rollers whereby the workpiece is simultaneously milled and stretched. The workpiece is heated along its side portions disposed inwardly from the side edge portions so as to eliminate concavities and bump transitional points which normally tend to form at and within the vicinity of the side portions, and in addition, the side edge portions of the sheet workpiece are also heated so as to cooperate with the heated, axially inward side portions so as to advantageously control the degree of flatness of the sheet workpiece across the width thereof after the same has been milled and stretched.

6 Claims, 5 Drawing Sheets

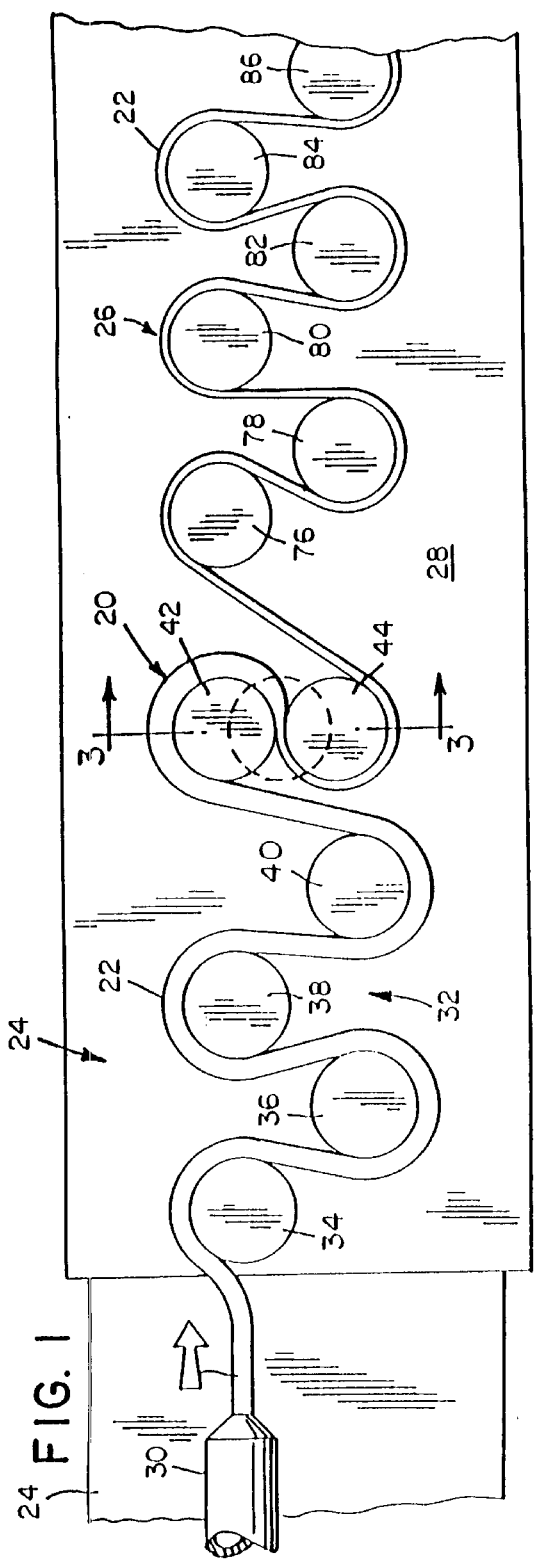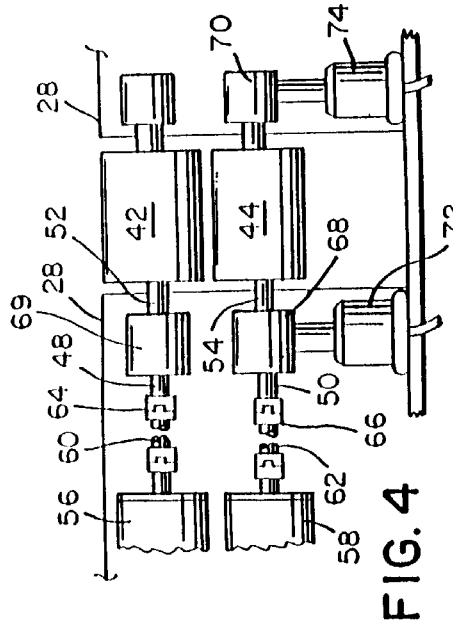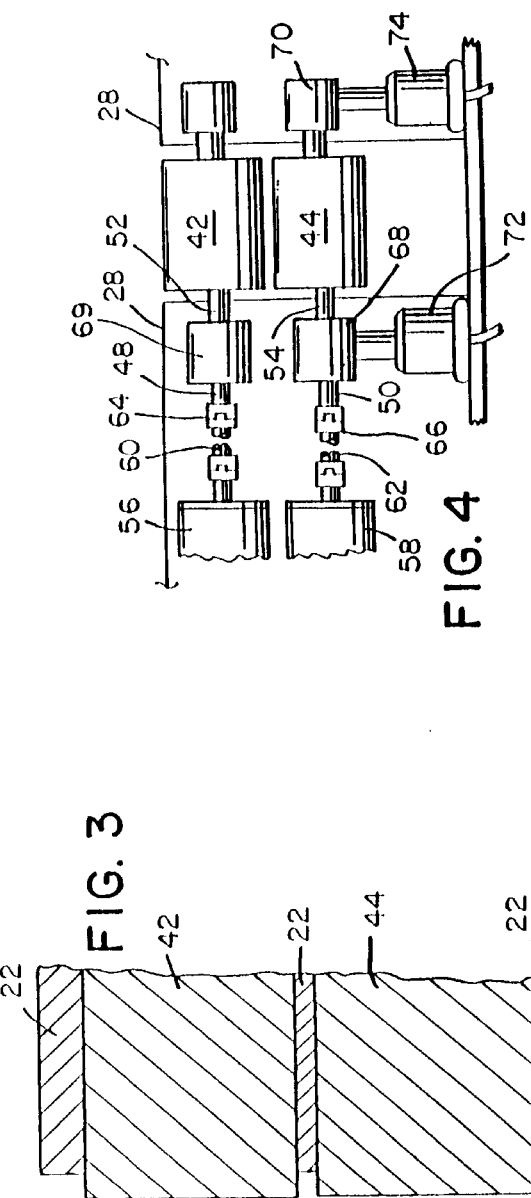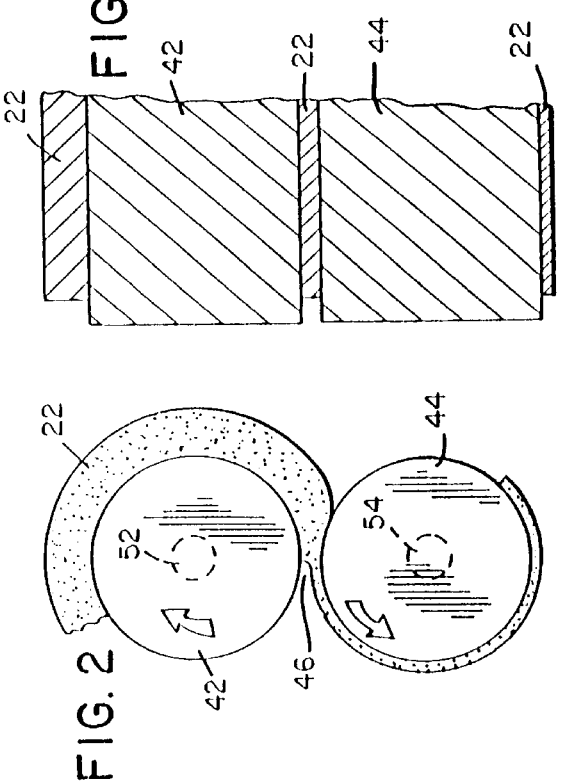

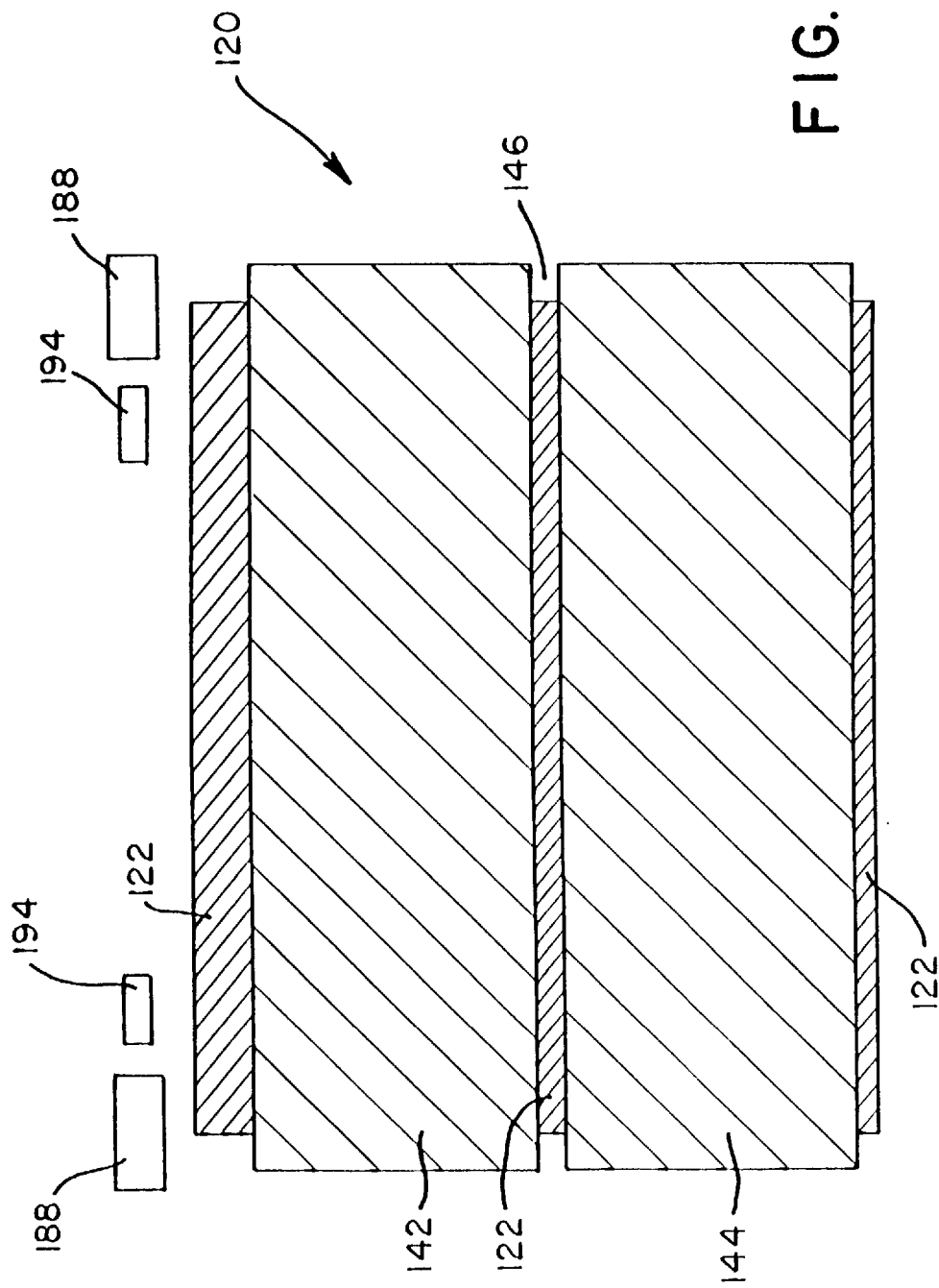

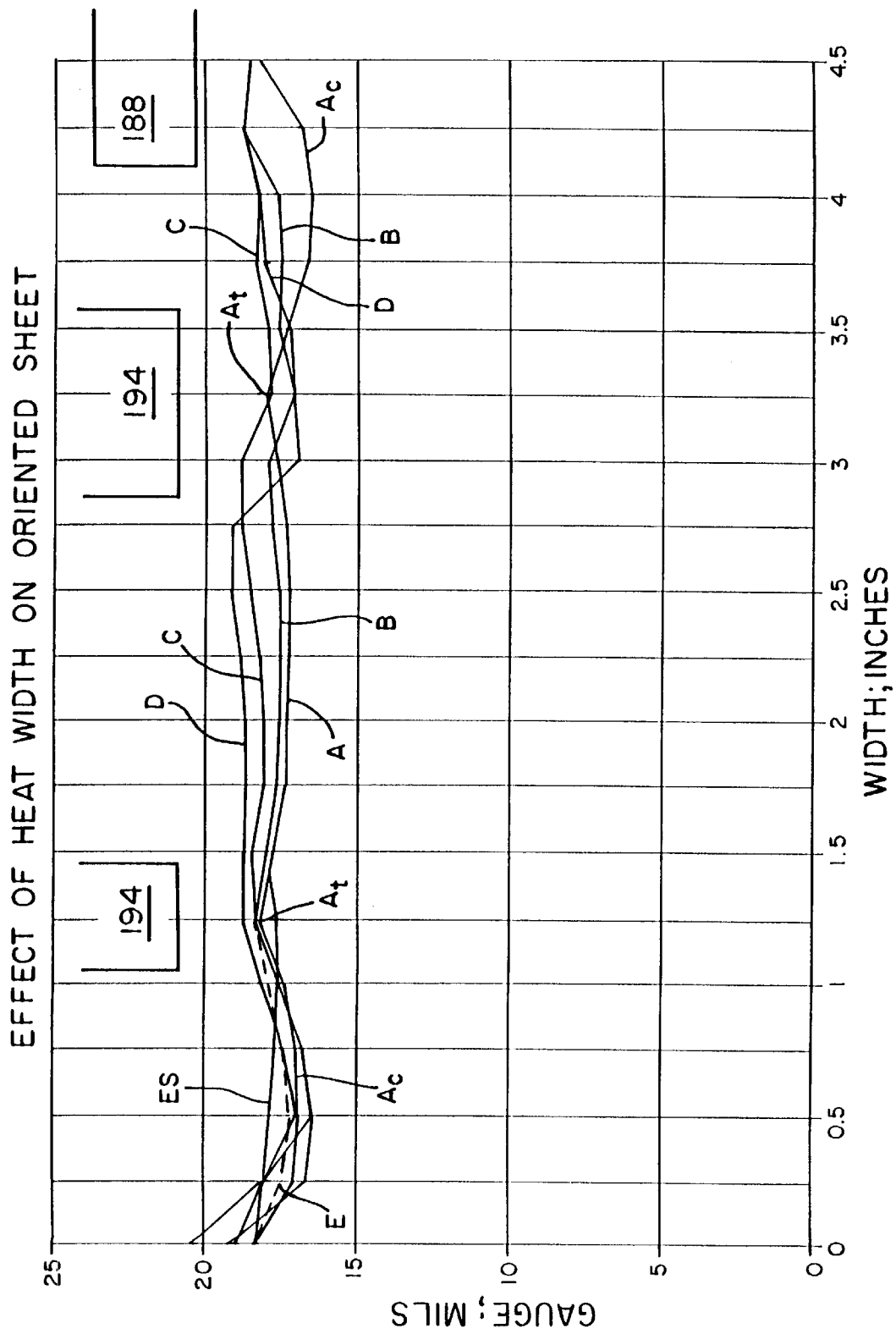

METHOD AND APPARATUS FOR PRODUCING ORIENTED PLASTIC STRAP, AND STRAP PRODUCED THEREBY

CROSS-REFERENCE TO RELATED PATENT APPLICATIONS

This application is a division, of application Ser. No. 08/474,355, filed Jun. 7, 1995 now U.S. Pat. No. 5,660,787, which, in turn, is a CIP of Ser. No. 08/353,721 filed Dec. 12, 1994, now U.S. Pat. No. 5,525,287, which, in turn, is a CIP of Ser. No. 07/958,803, filed Oct. 9, 1992, now U.S. Pat. No. 5,387,388.

This patent application is a Continuation-In-Part (CIP) patent application of U.S. patent application Ser. No. 08/353,721 filed on Dec. 12, 1994 by Donald L. Van Erden et al. and entitled METHOD AND APPARATUS FOR PROCUCING ORIENTED PLASTIC STRAP, AND STRAP PRODUCED THEREBY which, in turn, is a Continuation-In-Part (CIP) patent application of U.S. patent application Ser. No. 07/958,803 filed on Oct. 9, 1992 by Donald L. Van Erden et al. and entitled METHOD AND APPARATUS FOR PRODUCING ORIENTED PLASTIC STRAP, now U.S. Pat. No. 5,387,388.

FIELD OF THE INVENTION

The present invention relates generally to a method and apparatus for producing an oriented plastic strap, and a strap produced by such method and apparatus, and more particularly to a method and apparatus for simultaneously milling and stretching a plastic sheet into strap stock material having a predetermined desired thickness profile.

BACKGROUND OF THE INVENTION

In accordance with a typical prior art stretching process, such as, for example, the SIGNODE process, a cast sheet of thermoplastic material, such as, for example, polypropylene, is first reduced in size, that is, the thickness dimension thereof, by rolling the sheet through a pair of closely spaced milling rollers or cylinders which rotate in opposite directions. After the thickness of the sheet has been reduced, the sheet is then drawn and stretched out from the milling rollers by means of a series of orienting rollers or a bridle assembly so as to achieve its finalized desired size or thickness.

Another prior art process or method that is commonly used in connection with the fabrication of stretched sheet materials is a process known as or called the short-gap method and is generally comprised of an entry bridle, a stretching assembly, and an exit bridle. In accordance with this process, a slow speed, heated entry bridle assembly advances a cast sheet of material, usually film, to a stretching assembly which comprises a pair of rollers or cylinders which are set a predetermined distance apart. The first roller rotates at the same speed as the entry bridle, whereas the second roller rotates at a speed which is greater than that of the first roller and which is equal to the rotary speed of the exit bridle. Thus, as the film passes through the entire assembly, it is stretched to its finalized desired size or thickness dimension.

These prior art methods or processes have presented several disadvantages. For example, the properties of the straps produced by these methods or processes provide or exhibit limited increases in strength without significant decreases in other desired properties. In addition, substantial necking of the sheets occur as the sheets are stretched over the distance or space defined between the rollers.

U.S. patent application Ser. No. 07/958,803, now U.S. Pat. No. 5,387,388, disclosed a novel process and apparatus for achieving the simultaneous milling and stretching of such sheets whereby the aforenoted problems were minimized, however other operational problems with such process and apparatus were discovered which likewise required rectification in order to achieve simultaneously milled and stretched sheets of thermoplastic material which exhibited other desirable properties. For example, one operational problem or deficiency which was discovered in connection with the fabrication or manufacture of the simulaneously milled and stretched sheets of thermoplastic material in accordance with the zero-gap process and apparatus set forth and described within U.S. Pat. No. 5,387,388 is that when the thermoplastic sheet is ready to be worked, that is, simultaneously milled and stretched, by being conducted through the nip defined between the oppositely rotating rollers of the zero-gap assembly, it was found that the opposite surfaces of the thermoplastic sheet exhibited different surface temperature values. This is because as the thermoplastic sheet is routed about the first or upstream roller of the zero gap roller assembly, the inside surface of the thermoplastic sheet that is, the surface of the sheet which is disposed in direct contact with the first or upstream roller of the roller assembly, will be heated by the first or upstream roller, or at least have its surface effectively prevented from being cooled by the ambient air because such surface is disposed in direct contact with the the first or upstream roller and not exposed directly to the ambient air. On the contrary, the outer or exterior surface of the thermoplastic sheet, that is, the surface of the sheet which is not disposed in direct contact with the first or upstream roller, is effectively cooled as a result of being exposed to the ambient air. Such temperature differential between the aforenoted surfaces of the thermoplastic sheet leads to density differentials throughout the thermoplastic sheet which adversely affects the various properties of the processed sheet, such as, for example, the tensile strength, weldability and associated properties, and split resistance.

Another problem or deficiency which was discovered in connection with the aforenoted zero-gap simultaneous milling and stretching apparatus and method was that as a result of the processing of the thermoplastic sheet, the opposite edge portions of the sheet became thickened, or in other words, the sheet did not exhibit uniform thickness or flatness across the width thereof. Consequently, when the processed sheet is to be subsequently processed into thermoplastic strapping, the thickened edge portions cannot be used to fabricate such straps unless further processing is performed upon the sheet so as to effectively reduce the thickness dimension of the edge portion to the desired thickness dimension characteristic of useable strapping.

Accordingly, the invention embodied and disclosed within U.S. patent application Ser. No. 08/352,721 was directed toward an apparatus and method for producing an oriented plastic strap which was simultaneously milled and stretched as a result of a thermoplastic sheet workpiece being passed through a nip defined between the oppositely rotating rollers of the zero-gap assembly, and wherein, in particular, in order to overcome the aforenoted deficiency of the zero-gap simultaneous milling and stretching apparatus and method with respect to the thickened edge portions of the milled and stretched sheet, edge heaters were disposed along the opposite edge regions of the sheet workpiece prior to entry of the sheet workpiece into the nip defined between the zero-gap milling rollers. Such edge heating was found to significantly reduce the width of the thickened edge portions of the milled and stretched sheet, as measured inwardly from the edge portions of the sheet, such that an increased amount of useable sheet could be produced while concomitantly resulting in a reduced amount of sheeting which had to be previously trimmed and discarded.

Additional studies performed in connection with the strap profile and the effects upon the same by means of the disposition of the aforenoted edge heaters have revealed, however, that while such edge heaters have in fact reduced the thickness dimensions of the sheets at the extreme outer edge portions thereof, concave portions or concavities are nevertheless still present within regions immediately adjacent to the extreme outer edge portions of the sheets. The concave portions have depth or thickness dimensions which are somewhat less than the thickness dimension characteristic of the main central portion of the milled and stretched sheet. In addition, a transitional bump region is also present at the junction between the main central portion of the sheet and the concave side edge portions thereof, and such transitional bump regions have thickness dimensions which are greater than that of the main central portion of the sheet.

A need therefore exists for the development of apparatus, and a concomitant method, for producing oriented plastic sheets by simultaneously milling and stretching the same wherein the produced sheets exhibit substantially uniform thickness dimensions across the entire width thereof from one edge portion to the opposite edge portion by effectively eliminating the aforenoted concavities and transitional bump regions.

OBJECTS OF THE INVENTION

Accordingly, it is an object of the present invention to provide a new and improved method and apparatus for producing oriented plastic strap, and an oriented plastic strap produced by such method and apparatus.

Another object of the present invention is to provide a new and improved method and apparatus for producing oriented plastic strap, and an oriented plastic strap produced by such method and apparatus, which overcomes the various disadvantages, problems, and deficiencies of the prior art processes and apparatus.

Yet another object of the present invention is to provide a new and improved method and apparatus for producing oriented plastic strap which is capable of simultaneously milling and stretching a sheet workpiece into a strap which has a predetermined thickness dimension as a result of the sheet workpiece being conducted in a single pass through a nip defined between a pair of zero-gap rollers.

Still another object of the present invention is to provide a new and improved method and apparatus for producing oriented plastic strap, and an oriented plastic strap produced by such method and apparatus, which has significantly increased tensile strength and split resistance when compared to straps produced by heretofore known prior art methods and apparatus.

A further object of the present invention is to provide a new and improved method and apparatus for producing oriented plastic strap, and an oriented plastic strap produced by such method and apparatus, which exhibits high tensile strength, high split resistance, and improved welding characteristics.

A yet further object of the present invention is to provide a new and improved method and apparatus for producing oriented plastic strap, and an oriented plastic strap produced by such method and apparatus, wherein uniform density characteristics are imparted to the sheet workpiece such that the milled and stretched strap produced within the zero-gap roller assembly exhibits improved tensile strength, weld, and split resistance properties.

A still further object of the present invention is to provide a new and improved method and apparatus for producing oriented plastic strap, and an oriented plastic strap produced by such method and apparatus, wherein improved uniform thickness and flatness characteristics are imparted to the finalized milled and stretched strap as a result of various heating techniques being imparted to the original sheet workpiece or material.

SUMMARY OF THE INVENTION

Briefly, the foregoing and other objects are achieved in accordance with the present invention through the provision of a method and apparatus for producing an oriented plastic strap which will have a predetermined desired thickness for use in strapping packages and the like, wherein the strap, having the noted predetermined desired thickness, is simultaneously milled and stretched as a result of a plastic sheet workpiece being passed through a nip defined between a pair of rollers or cylinders which are spaced closely together with respect to each other. The nip has a space dimension which is substantially less than the original thickness dimension of the sheet workpiece, and the rollers are rotated in opposite directions and at substantially different lineal surface velocities.

In order to improve the various properties of the simultaneously milled and stretched strap, the density of the sheet workpiece, prior to entry into the aforenoted nip defined between the pair of milling rollers, is rendered more uniform across the thickness of the sheet workpiece by heating the outer surface of the sheet workpiece to an elevated temperature level or value, that is, to a temperature level or value which is greater than that of the inner surface of the sheet workpiece which is disposed in contact with the first or upstream one of the milling rollers, such that despite the cooling of the outer surface of the sheet workpiece as a result of the exposure of the outer surface of the sheet workpiece to the ambient air, the inner and outer surfaces will exhibit substantially the same temperature levels and therefore substantially the same or uniform density values.

In order to improve the flatness of the resultant simultaneously milled and stretched sheet such that increased volumetric strapping can be produced from such sheeting, edge heaters are disposed along the opposite edge regions of the sheet workpiece prior to entry of the sheet workpiece into the nip defined between the zero-gap milling and stretching rollers. Such edge heating has been found to significantly reduce the width of thickened edge portions of the milled and stretched sheet, as measured inwardly from the edge portions of the sheet, such that an increased amount of useable sheet can be produced while concomitantly resulting in a reduced amount of sheeting which must be trimmed and discarded.

Still further, in order to further improve the flatness of the resultant simultaneously milled and stretched sheet such that increased volumetric strapping can be produced from such sheeting, strip heaters are disposed axially inwardly with respect to the edge heaters as considered or viewed along the longitudinal axes of the milling and stretching rollers. The strip heaters are disposed about the first or upstream one of the milling and stretching rollers and at positions prior to or upstream of the nip defined between the zero-gap milling and stretching rollers. The strip heaters can be employed alone, that is, without conjunctive use in connection with the aforenoted edge heaters, or preferably, the strip heaters can be employed with and supplemental to the aforenoted edge heaters. The use of such strip heaters, particularly in conjunction with the aforenoted edge heaters, has been found to substantially eliminate the aforenoted concave portions of the simultaneously milled and stretched sheeting, and similarly, to significantly reduce the thickness dimensions of the aforenoted transitional bump regions defined between the main central portion of the sheeting and the concave edge portions of the sheeting. Consequently, the sheeting is provided with a substantially uniform thickness dimension or profile across the entire width thereof extending between one side edge and the opposite side edge whereby an increased volumetric amount of useable sheeting can be produced and is available for finalized production or fabrication of the desired plastic strapping.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a fragmentary, front view of apparatus, constructed in accordance with the present invention, for producing oriented plastic strap in accordance with the zero-gap manufacturing process of the present invention;

FIG. 2 is an enlarged, simplified, fragmentary front view of the milling and stretching rollers defining or comprising the zero-gap assembly of FIG. 1;

FIG. 3 is an enlarged, partial, cross-sectional view of the milling and stretching rollers defining the zero-gap assembly of FIG. 1 as taken along the line 3—3 of FIG. 1;

FIG. 4 is a simplified, fragmentary, cross-sectional view, on a reduced scale, of the milling and stretching rollers defining the zero-gap assembly of FIG. 1, as taken along a line or direction parallel to line 3—3 of FIG. 1;

FIG. 8 is an enlarged, simplified, cross-sectional view, similar to that of FIG. 3, showing the relative disposition, location, or placement of the edge heaters and the strip heaters of the present invention with respect to the sheet workpiece prior to, and upstream of the, entry of the sheet workpiece into the nip defined between the milling and stretching rollers defining or comprising the zero-gap assembly of the present invention; and FIG. 9 is a graphical presentation of various cross-sectional profiles of oriented plastic strap produced in accordance with the zero-gap manufacturing process of the present invention, wherein the various graphical curves or plots illustrate the effect, upon the thickness or profile dimensions of the oriented sheets, of the strip heaters of the present invention when such strip heaters are used alone or in conjunction with the edge heaters, and as compared to profiles of the oriented sheet when neither edge or strip heaters are employed or when only edge heaters are employed.

DETAILED DESCRIPTION OF THE ILLUSTRATED EMBODIMENTS

Figure 5:
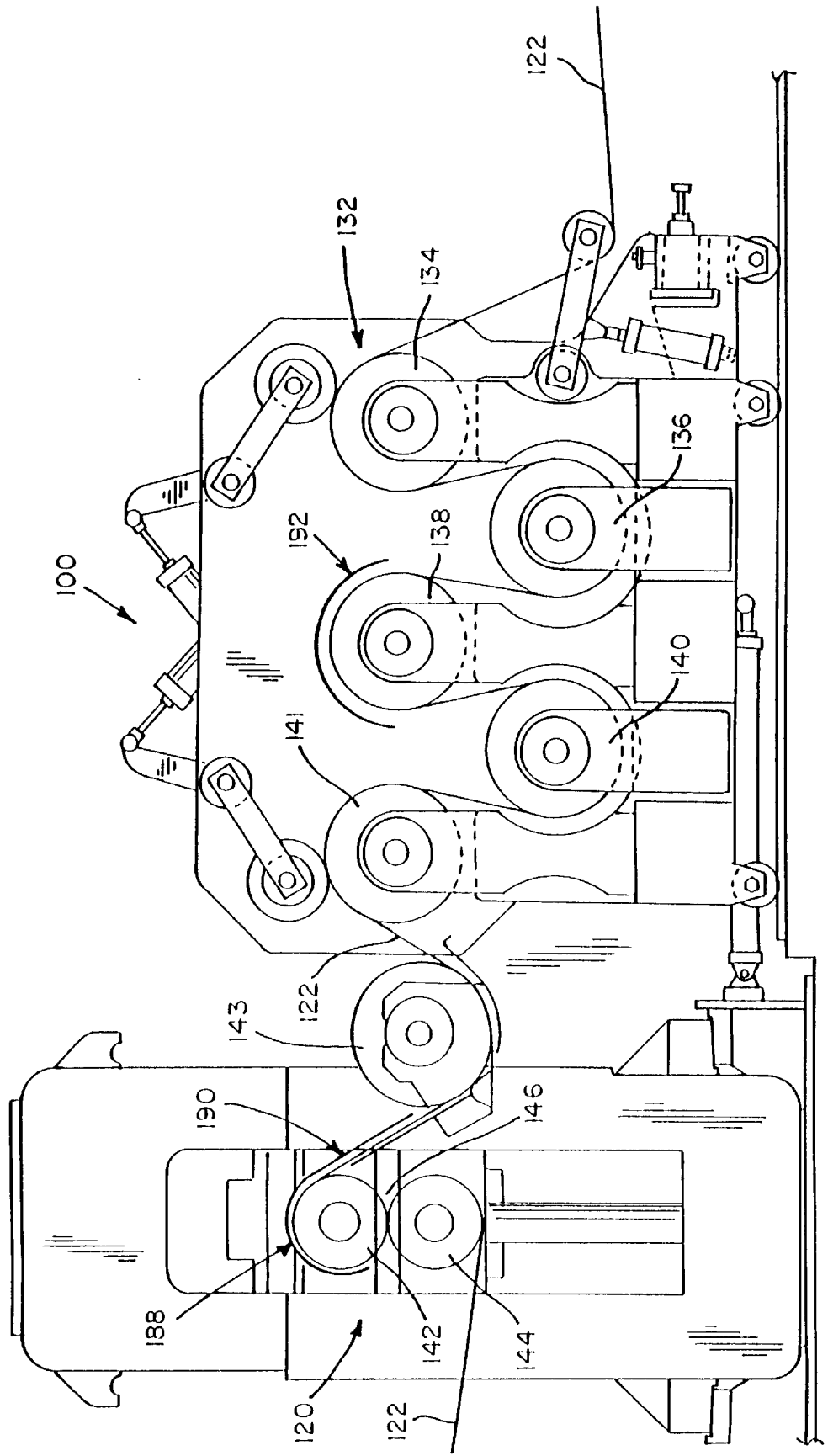
FIG. 5 is a front view of apparatus, constructed in accordance with the present invention and similar to the apparatus shown in FIG. 1, showing, however, a modified embodiment for producing oriented plastic strap in accordance with the zero-gap manufacturing process of the present invention wherein the sheet workpiece has its external surface heated prior to entry into the zero-gap roller assembly, as well as its edge portions heated prior to entry into the nip defined between the milling and stretching rollers of the zero-gap roller assembly.

Referring now to the drawings, and more particularly to FIG. 1 thereof, there is schematically illustrated a zero-gap roller assembly, generally indicated by the reference character 20, for simultaneously milling and stretching or elongating a sheet workpiece 22 into a thin strap stock material. The present invention is discussed and illustrated with only a single sheet workpiece 22 being conducted through the assembly 20, however, it is to be understood that more than one sheet or workpiece 22 may be simultaneously passed through the assembly 20. It is to be further noted that the phrase or terminology "zero-gap" as used throughout this patent specification refers to the concept of substantially eliminating any gap between the step of milling the sheet workpiece and the step of stretching the sheet workpiece. In other words, the steps of milling and stretching of the sheet workpiece are accomplished substantially simultaneously. In addition, it is noted, as disclosed in FIG. 1, that the zero-gap assembly 20 is located between a sheet or workpiece feeding assembly 24 and an exit bridle assembly 26 which are located or mounted upon a frame or support 28.

The feeding assembly 24 may take any one of several forms, and as shown in FIG. 1, comprises an extruding machine 30 for extruding a sheet or workpiece 22 of stock material, and an entry bridle assembly 32. The extruding machine 30 produces a sheet workpiece 22 from a suitable material, such as, for example, polypropylene, polyethylene terephthalate, or the like, and the sheet workpiece 22 is conducted into the entry bridle assembly 32 which, in turn, feeds the sheet workpiece into the zero-gap roller assembly 20. The sheet workpiece 22 may be heated during its passage through the entry bridle assembly 32 so as to in effect be pre-heated upon entry into the zero-gap assembly 20 in order to enhance the working properties of the material comprising the sheet workpiece 22.

The entry bridle assembly 32 is seen to comprise a plurality of rollers or cylinders 34, 36, 38, and 40 which are mounted by suitable means, such as, for example, shafts, not shown, upon the frame or support 28. The rollers 34, 36, 38, and 40 may be either solid or hollow, and in the preferred embodiment, as illustrated in FIG. 1, the rollers 34, 36, 38, and 40 are essentially only used to properly deliver or feed the sheet workpiece 22 into the zero-gap assembly 20, and they do not substantially contribute to any stretching or milling of the sheet workpiece 22. A different number of rollers may be employed than that shown in FIG. 1, and it is seen that the rollers 34, 36, 38, and 40 are arranged within two vertically spaced rows with the bottom row rollers 36 and 40 being located between or offset with respect to the top row rollers 34 and 38. Rollers 34 and 38 are also mounted for rotation in the clockwise direction while rollers 36 and 40 are mounted for rotation in the counterclockwise direction, whereby when the sheet workpiece 22 is wound around or routed through the entry bridle assembly 32, it travels through the rollers 34, 36, 38, and 40 in the proper mode or direction with respect to the directions of rotation of the rollers 34, 36, 38, and 40. Each one of the rollers 34, 36, 38, and 40 are rotated at a uniform speed by suitable means, not shown, such as, for example, a motor and shaft drive assembly, and all of the rollers 34, 36, 38, and 40 rotate at substantially the same speed or lineal surface velocity as the top roller 42 of the zero-gap assembly 20, which will be discussed in greater detail hereinafter.

Continuing further, after the sheet workpiece 22 passes through the feeding assembly 24, it advances toward the zero-gap assembly 20 for simultaneous milling and stretching into a finished sheet 22 which has a predetermined desired thickness. The zero-gap assembly 20 comprises a pair of rollers or cylinders 42 and 44 that are rotatably mounted in an opposing relationship. The nip 46, that is, the distance defined between the rollers 42 and 44, can be substantially varied depending upon the desired finished thickness of the finished sheet 22. The zero-gap rollers 42 and 44 may either be solid or hollow, and may be heated by any well-known means, not shown, such as, for example, circulating a heated fluid through the rollers 42 and 44, in order to enhance the stretching properties of the sheet material. The zero-gap rollers 42 and 44 may also be flat, as shown in FIGS. 1–4, or may be contoured, not illustrated herein but illustrated in the aforenoted patent application, Ser. No. 08/352,721, in order to change the shape of the sheet workpiece 22 as it passes through the rollers 42 and 44 of the zero-gap assembly 20.

As best shown in FIG. 2, the upper roller 42 is driven in a clockwise direction, as shown by means of its arrow, and the bottom or lower roller 44 is driven in the counterclockwise direction as similarly shown by means of its arrow. Thus, the sheet workpiece 22 is first routed around a major circumferential portion of the top or upper roller 42, the workpiece 22 is then conducted through the nip 46 defined between the rollers 42 and 44, and is then conducted around a major circumferential portion of the bottom or lower roller 44. More particularly, it is appreciated that the sheet workpiece 22 is disposed in surface contact with each one of the rollers 42 and 44 over a circumferential extent which is greater than one-half of each of the circumferential dimensions of each one of the rollers 42 and 44, and it is further noted that as a result of this particular routing of the sheet workpiece 22 through the nip 46 defined between the rollers 42 and 44, and about the outer circumferential or peripheral surfaces of the rollers 42 and 44, each roller 42 and 44 is disposed in contact with an opposite surface or side of the sheet workpiece 22.

In accordance with the preferred, illustrated embodiment of the present invention, as shown in FIGS. 1–4, and as has been described in detail, the milling and stretching rollers 42 and 44 of the zero-gap assembly 20 are disposed in a top-bottom or upper-lower arrangement with respect to each other, however, it is to be appreciated that the rollers 42 and 44 may alternatively be disposed in a side-by-side arrangement in which case the top or upper roller 42 will be disposed toward the left of the bottom or lower roller 44 such that the roller 42 will be the first roller that the sheet workpiece 22 contacts, while the bottom or lower roller 44, which is now, in effect, the right roller, will be the second roller that the sheet workpiece 22 contacts. As best seen in FIG. 2, the rollers 42 and 44 are respectively mounted upon rotary shafts or axles 52 and 54.

With particular reference being made to FIG. 4, the drive system for the rollers 42 and 44 is disclosed therein, and it is seen that the axles or shafts 52 and 54 of the rollers 42 and 44 are operatively connected, through means of bearings 69 and 68, to driven shafts 48 and 50. Suitable drive means 56 and 58, such as, for example, electric motors, are mounted upon the support 28 and drive the rollers 42 and 44, respectively, through means of drive shafts 60 and 62 which are connected to the shafts 48 and 50 by means of suitable couplings 64 and 66, coupling 66 preferably comprising a universal coupling for reasons to become apparent shortly. The bottom or lower roller 44 is connected to the support 28 through means of bearings 68 and 70, and the coupling 66, and bearings 68 and 70, permit the bottom or lower roller 44 to move with respect to the support 28 by means of actuators 72 and 74. In this manner, the bottom or lower roller 44 is able to be moved toward or away from the stationary top or upper roller 42 so as to desirably change the size of the nip 46 defined between the rollers 42 and 44. Each one of the driven shafts 48 and 50 is independently driven by its separate drive means 56 and 58, and the bottom or lower roller 44 is driven at a speed greater than that of the top or upper roller 42. In particular, in accordance with the teachings of the present invention, the lower or bottom roller 44 is driven in such a manner that its lineal surface velocity is preferably within the range of seven to twelve (7–12) times greater than the lineal surface velocity of the top or upper roller 42 when the sheet workpiece 22 comprises polypropylene, however, as disclosed within U.S. patent application Ser. No. 08/485,538, now U.S. Pat. No. 5,695,709, entitled METHOD AND APPARATUS FOR PRODUCING HIGHLY ORIENTED POLYESTER SHEET, and filed on the same date herewith, the overall draw or lineal surface velocity ratio is approximately six (6) times greater or 6:1 when the workpiece 22 comprises polyester, that is, polyethylene terephthalate.

In view of the foregoing, it can therefore be appreciated that as the sheet workpiece 22 is passed through the nip 46 defined between the upper and lower rollers 42 and 44 of the zero-gap assembly 20, the top or upper roller 42 effectively operates as a brake, and the mill reduction operation per se may also effectively operate as a brake, upon the lower surface of the sheet workpiece 22, that is, the surface disposed in contact with the upper roller 42, while the bottom or lower roller 44 pulls and accelerates the sheet workpiece 22, the roller 44 effectively operating upon the upper surface of the sheet workpiece 22, that is, the surface thereof which is disposed in contact with the roller 44. As the sheet workpiece 22 accelerates through the nip 46 defined between the rollers 42 and 44, it is simultaneously milled and stretched to its final predetermined thickness which may in fact be less than the space dimension of the nip 46 as defined between the rollers 42 and 44. In particular, the thickness of the finished sheet 22 depends upon the lineal surface velocity differential defined between the top roller 42 and the bottom roller 44, that is, the faster the bottom or lower roller 44 rotates relative to the top or upper roller 42, the thinner the finished sheet 22 will be. It is also to be noted that some stretching may occur slightly before or after the nip 46 defined between the rollers 42 and 44 depending, again, upon the surface velocity of the bottom roller 44. Thus, as has been noted hereinabove, there is essentially a zero gap between the milling and stretching functions or operations performed in connection with the sheet workpiece 22 and the processing thereof into the finalized or finished sheet 22. As a result of such simultaneous milling and stretching processing, it has been noted that there is substantially less necking of the sheet width as compared to the parameters of sheets which have undergone stretching methods in accordance with prior art processes or techniques wherein the sheet is stretched only after the milling step has been completed.

After the finished sheet 22 exits from the zero-gap assembly 20, it is conducted through the exit bridle assembly 26. The exit bridle assembly 26 may take any one of several different forms, and as shown in FIG. 1, the assembly preferably comprises a plurality of rollers or cylinders 76, 78, 80, 82, 84, and 86 which are mounted by suitable means, such as, for example, shafts or axles, not shown, upon the support 28. The assembly 26, and in particular the rollers 76–86, are used to pull the finished sheet 22 out from the zero-gap assembly 20. The rollers 76, 78, 80, 82, 84, and 86 may be solid or hollow, and more or fewer rollers than those disclosed may be used. The rollers 76, 78, 80, 82, 84, and 86 do not substantially contribute to any stretching of the finished sheet 22, and as seen in FIG. 1, are arranged in two vertically spaced rows with the bottom or lower row rollers 78, 82, and 86 also being spaced between the top or upper row rollers 76, 80, and 84 as considered in the transverse direction. The upper rollers 76, 80, and 84 all rotate in the clockwise direction, while the lower rollers 78, 82, and 86 all rotate in the counterclockwise direction such that the finished sheet 22 can be properly conducted through the exit bridle assembly 26. The rollers 76, 78, 80, 82, 84, and 86 are rotated at a uniform rate of speed by suitable drive means, not shown, such as, for example, a motor and shaft assembly, and the speed of the rollers 76, 78, 80, 82, 84, and 86 is such that the lineal surface velocities thereof are essentially the same as that of the bottom or lower roller 44 of the zero-gap assembly 20.

It is to be appreciated that in accordance with further teachings of the present invention, another stretching process and apparatus for implementing the same, such as, for example, a short gap stretching apparatus, system, or assembly, may be used either before or after the zero-gap assembly 20 so as to further modify or enhance the characteristics of the finished sheet 22.

Having now disclosed the specifics of the apparatus comprising the present invention, the method to be practiced by means of such apparatus and in accordance with the present invention will now be described. More particularly, the sheet workpiece 22 is fed from the extruding machine 30 to the entry bridle assembly 32 and is wound around the entry bridle assembly rollers 34, 36, 38, and 40 so as to be, in turn, properly conducted into the zero-gap assembly 20. The sheet workpiece 22 is then fed around the top or upper roller 42 of the zero-gap assembly 20, the top or upper roller 42 of the assembly 20 being driven at the same lineal surface velocity as that of the entry bridle rollers 34, 36, 38, and 40. As the sheet workpiece 22 enters the zero-gap assembly 20, it travels around the outer peripheral surface of the top or upper roller 42 until it reaches the nip 46 defined between the top or upper roller 42 and the bottom or lower roller 44. As previously noted, the faster rotating bottom or lower roller 44 pulls the sheet workpiece 22 through the nip 46 while the slower rotating top or upper roller 42, as well as the mill reduction process per se, effectively acts as a brake upon the lower surface of the sheet workpiece 22, that is, the surface of the workpiece 22 which is disposed in contact with the upper or top roller 42. Thus, the sheet 22 accelerates through the nip 46 defined between the rollers 42 and 44, and is simultaneously milled and stretched to its finalized predetermined thickness dimension as the same passes through the nip 46. The exit bridle assembly 26 subsequently pulls the finished sheet 22 off from the bottom or lower roller 44 of the zero-gap assembly 20, and it is therefore appreciated that in accordance with the method of the present invention, there is able to be achieved the production of a thin, flat, oriented sheet 22 which is ready to be surface treated and/or heat treated as desired, and sliced into thin straps as required or desired for use in strapping packages and the like in accordance with known procedures.

It is again reiterated that the above-described apparatus and process produce a significantly better quality strap than those able to be formerly produced in accordance with known or prior art apparatus and processes, as also exemplified and illustrated by means of the various data noted in the following table:

TABLE I

|  | SINGLE DRAW PROCESS | ZERO-GAP PROCESS |
| --- | --- | --- |
| Tensile Strength (KPSI) | 45 | 64 |
| Elongation (%) | 25 | 13 |
| Modulus (at 2 and 5 KPSI) | 400 | 963 |
| Weld Strength (Lbs) | 79 | 187 |
| Weld Percent | 55 | 89 |
| Weld Equivalent (KPSI) | 25 | 57 |
| Split (In) | 00.7 | 00.07 |

As can be appreciated from the table noted above, the zero gap method produces strapping which exhibits higher tensile strength, and a stronger and higher percentage weld. Furthermore, splitting of the strapping has been essentially eliminated while still achieving high tensile strength, whereas in accordance with known or prior art manufacturing techniques and processes, as the tensile strength is increased, increased splitting occurs and the percent of weld strength decreases. Still further, since the tensile strength of the strapping produced in accordance with the zero-gap process is approximately 1.47 times the tensile strength of conventionally produced strapping, and since the elongation of such strapping of the present invention is approximately one-half that of the conventional strapping, better creep performance is achieved. Such results present several marketing advantages in connection with polypropylene or polyethylene terephthalate (PET) material straps. More particularly, if the break strength of the strapping is a controlling factor in connection with the particular application or use of the strapping, then the higher tensile strength of the material will permit the use or substitution of a strap which comprises only approximately seventy percent of currently used material or strapping. Similarly, if stiffness is a controlling factor, characteristic, or attribute, the strapping produced in accordance with the present invention is such as to be readily capable of being reliably fed into a strapping machine by being pushed around a guide chute of the strapping machine. Still yet further, if weld strength of the strapping is a controlling factor or characteristic, then strapping comprising less than one-half of the currently or conventionally used raw material will produce the equivalent joint strength.

The various properties resulting from the process of the present invention give significant flexibility of design to the strapping which may then be used in connection with a variety of applications. It is believed, for example, that the strapping produced by means of the process of the present invention exhibits a stronger bond across the grain, while still being relatively easy to tear the strap across the grain. Furthermore, the strap produced by means of the zero-gap process of the present invention does not exhibit structural delamination as is often chracteristic of most prior art strapping. Since the strap of the present invention does not exhibit structural delamination, higher weld strength is also obtained. As has also been noted hereinbefore, if a prestretch step is performed between the entry bridle assembly and the zero-gap assembly, or if a post-stretch step is performed between the zero-gap assembly and the exit bridle assembly, the same overall characteristics are achieved as are achieved in accordance with the embodiment of the invention described in connection with the system and process of FIGS. 1–4. It is noted, however, that if a pre-stretch process step is performed upon the sheet workpiece 22, a higher tensile modulus can be achieved, whereas if a post-stretch process step is performed upon the finished sheeting 22, the material comprising the sheeting has a somewhat greater tendency toward fibrillation.

With reference again being made to the apparatus or system of FIG. 1, it has been discovered that when the sheet workpiece 22 is conducted through the entry bridle assembly 32, and particularly as the workpiece 22 approaches the upper milling and stretching roller 42 of the zero-gap assembly 20, the upper or outer surface of the sheet workpiece 22, that is, the surface thereof which is not disposed in contact with the peripheral surface of the upper or top roller 42 of the zero-gap assembly 20, will tend to cool at a faster rate than the lower or inner surface of the sheet workpiece 22 which is disposed in contact with the peripheral surface of the upper or top roller 42 of the zero-gap assembly 20 in view of the fact that the upper or outer surface of the sheet workpiece 22 is directly exposed to the ambient air. As a result of such uneven or unequal cooling of the surfaces, or as a result of the development of such a temperature differential between the noted surfaces of the sheet workpiece 22, the sheet workpiece 22 exhibits density differentials throughout the thickness thereof whereby such density differentials adversely affect some of the properties or characteristics of the sheet workpiece. Consequently, in order to rectify, resolve, or eliminate such problem, an improved system or apparatus, generally indicated by the reference character 100, has been developed and is shown in FIG. 5.

The apparatus 100 is seen to comprise an entry bridle assembly 132 similar to the entry bridle assembly 32 of the embodiment of FIG. 1, and similarly, there is disclosed a zero-gap assembly 120 which is similar to the zero-gap assembly 20 of the embodiment of FIG. 1 and is seen to comprise upper and lower milling and stretching rollers 142 and 144, respectively. The entry bridle assembly 132 is seen to comprise rollers 134, 136, 138, 140, and 141 all of which are heated to an operative temperature of approximately 265° F. The upper or top roller 142 of the zero-gap assembly 120 is heated to a temperature of approximately 290° F., and the lower or bottom roller 144 of the zero-gap assembly 120 is heated to a temperature of approximately 250° F. In accordance with this embodiment of the present invention, in order to maintain the outer surface of the sheet workpiece 122, that is, the surface of the sheet workpiece 122 which is not disposed in direct contact with the peripheral or circumferential surface of the upper or top roller 142 of the zero-gap assembly 120, at a temperature level which is substantially equal to the temperature level of the inner surface of the sheet workpiece 122, that is, the surface of the sheet workpiece 122 which is disposed in direct contact with the peripheral or circumferential surface of the upper or top roller 142 of the zero-gap assembly 120, an additional heated roller 143 is interposed between the last roller 141 of the entry bridle assembly 132 and the upper or top roller 142 of the zero-gap assembly 120. Roller 143 is heated to an operative temperature of approximately 280° F., and accordingly, it is noted that while the surface temperature of the sheet workpiece 122 at a location just prior to entry into the entry bridle assembly 132, that is, at a position just immediately upstream of the first entry bridle assembly roller 134, is approximately 65° F., the surface temperature of the sheet workpiece 122 at a location immediately downstream of the entry bridle assembly 132 or, in other words, at the location interposed between the last entry bridle assembly roller 141 and the additional heated roller 143, is approximately 219° F., the sheet workpiece 122 obviously having been substantially heated by means of the heated entry bridle assembly rollers 134, 136, 138, 140, and 141. As a result of the further routing of the sheet workpiece 122 about the outer peripheral or circumferential surface of the additional heated roller 143, the outer surface of the sheet workpiece 122, that is, the surface of the sheet workpiece 122 which will not be disposed in contact with the upper or top roller 142 of the zero-gap assembly 120, is heated still further such that at a location interposed between the additional heated roller 143 and the upper or top roller 142 of the zero-gap assembly 120, the temperature of the outer surface of the sheet workpiece 122 is approximately 242° F. This is somewhat higher than the temperature of the opposite or inner surface of the sheet workpiece 122 which was not directly heated by means of the additional heated roller 143, however, when the inner surface of the sheet workpiece 122 comes into contact with the upper or top roller 142 of the zero-gap assembly 120, such inner surface will be heated further. In addition, the outer surface of the sheet workpiece 122 tends to cool due to the fact that such surface is not disposed in contact with the heated, upper or top roller 142 of the zero-gap assembly 120 and that such surface is exposed to the ambient air. Consequently, at a location which is immediately upstream of the nip 146 defined between the upper and lower rollers 142 and 144, respectively, of the zero-gap assembly 120, both surfaces of the sheet workpiece 122 will have approximately the same temperature which is approximately 236° F. In this manner, the density of the material comprising the sheet workpiece 122 is substantially uniform across the thickness dimension of the sheet workpiece 122 whereby optimum properties can be achieved in the finished sheet 122 which has by such time been simultaneously milled and stretched as a result of being passed through the nip 146 defined between the zero-gap assembly rollers 142 and 144. It is to be further noted that the outer surface of the finished sheet 122 which has just emerged from the nip 146 defined between the rollers 142 and 144, that is, the surface of the finished sheet 122 which is not disposed in contact with the lower or bottom roller 144, has a temperature of approximately 290° F., the sheet 122 having experienced such a dramatic increase in its temperature due to the working of the same within the zero-gap assembly 120 and having undergone simultaneous milling and stretching within the zero-gap assembly 120. After being routed around the outer peripheral or circumferential surface of the lower or bottom roller 144 of the zero-gap assembly 120, the finished sheet 122 is conducted downstream for further processing thereof in to elongated packaging straps, and at this location, the sheet 122 may exhibit a surface temperature of approximately 277° F.

It is to be emphasized that the importance of the provision of the additional heated roller 143 is to, in effect, "overheat" the outer surface of the sheet workpiece 122 with respect to the inner surface of the sheet workpiece 122 to such a degree that such "overheating" will compensate for the fact that such outer surface of the sheet workpiece 122 will not be otherwise heated as will the inner surface of the sheet workpiece 122 when the same is disposed in contact with the heated upper roller 142 of the zero-gap assembly 120, and that such outer surface of the sheet workpiece 122 will experience cooling thereof, which the inner surface of the sheet workpiece 122 will not, due to the fact that the outer surface of the sheet workpiece 122 is exposed to the ambient air whereas the inner surface of the sheet workpiece 122 is not exposed to the ambient air due to its surface contact with the outer peripheral surface of the upper roller 142 of the zero-gap assembly 120. In view of these factors, both surfaces will therefore exhibit substantially the same surface temperatures at a point immediately upstream of the nip 146 defined between the zero-gap assembly rollers 142 and 144 whereby the improved density profile across or throughout the thickness of the sheet workpiece 122, and the resultant properties derived from or dependent upon such uniform density profile, are able to be achieved.

Continuing further, it is known that during processing of the sheet workpiece 122, that is, by means of the aforenoted milling and stretching thereof, the side edge portions of the sheet workpiece 122 will tend to be thicker than the more centrally located portions of the sheet workpiece 122. The reason for this is that as the sheet workpiece 122 is elongated in the its longitudinal direction, the width and thickness dimensions thereof are accordingly reduced with respect to the width and thickness dimensions of the original, non-worked, cast sheet workpiece 122. In addition, the different regions of the sheet workpiece 112 will act differently with respect to each other, thereby leading to the differences in the thickness dimensions of the edge regions or portions of the sheet workpiece 122 and of the central portions or regions of the sheet workpiece 122. For example, if the sheet workpiece 122 was divided across its width dimension into equal small regions, it would be appreciated that the central regions would be laterally confined or restrained by neighboring regions upon opposite sides thereof, whereas within the edge regions of the sheet workpiece 122, such regions are only confined or restrained in one lateral direction or upon one side thereof because the opposite side comprises a free edge or side. In a similar manner, the upper and lower surfaces of the sheet workpiece are not confined or restrained, and this is true for both the central and edge portions or regions of the sheet workpiece. Consequently, when the sheet workpiece undergoes elongation, the central regions of the sheet workpiece cannot be reduced in width as much as the edge regions or portions because of the additional lateral constraints or confinements imposed upon the central regions or portions. However, in order that each region or portion retain its original volumetric value, even though the volumetric configuration of a particular region or portion may be reorganized or rearranged, the thickness dimension of the central regions or portions is reduced to a greater extent than the thickness dimension of the edge portions or regions, or alternatively, the thickness dimension of the edge regions or portions is greater than the thickness dimension of the central regions or portions of the sheet workpiece. When the sheet workpieces used in connection with the present invention usually have a width dimension of approximately twenty-four inches (24") after being simultaneously milled and stretched within the zero-gap assembly 120, it has been found that the thicker edge portions occur upon the opposite sides of the oriented or finished sheet 122 for a lateral or widthwise extent of approximately one and one-half inches (1.5").

In accordance with one of the objectives of the present invention, it is desired to effectively reduce the lateral or widthwise extent of the thickened side edge portions or regions of the finished oriented sheet 122, and it has been found that if the side edge portions of the sheet workpiece 122 were heated prior to the entry of the sheet workpiece 122 into the nip 146 defined between the zero-gap assembly rollers 142 and 144, the lateral or widthwise extent of the thickened side edge portions or regions of the finished oriented sheet 122 could be dramatically reduced whereby a substantially increased volume of the finished oriented sheet 122, having a desired, uniform thickness or degree of flatness, could be achieved. In particular, it has been found that the lateral or widthwise extent of each thickened side edge portion or region of the finished oriented sheet 122 can be significantly reduced from the aforenoted one and one-half inches (1.5") to approximately one half inch (0.5"). This reduction in the lateral or widthwise extent of the thickened side edge regions or portions of the finished oriented sheet 122 thus results in less waste or trim to be removed from the finished oriented sheet 122 and concomitantly results in a larger amount or volume of finished oriented sheet 122 which may then be processed into strapping material.

Briefly, as best understood, one reason that the aforenoted heating of the side edge portions of the sheet workpiece prior to entry into the nip region 146 defined between the zero-gap assembly rollers 142 and 144 would result in the reduction of the widthwise or lateral extent of the thickened side edge portions of the finished oriented sheet 122 is that within the sheet workpiece 122, tensile forces or loads act inwardly toward the central region of the sheet workpiece 122, and the ability to resist tensile loads is a function of temperature. Consequently, when you heat the side edge portions of the sheet workpiece 122, the resistance to the tensile loads is decreased within those regions or portions whereby such outer or side edge portions or regions tend to expand in the lateral or widthwise direction such that the side edge portions or regions of the finished oriented sheet 122 tend to become thinner with a somewhat corresponding increase in the overall width of the finished oriented sheet 122 as compared to a similarly finished, oriented sheet 122 which was not pre-heated within the side edge portions or regions thereof.

Figure 6:
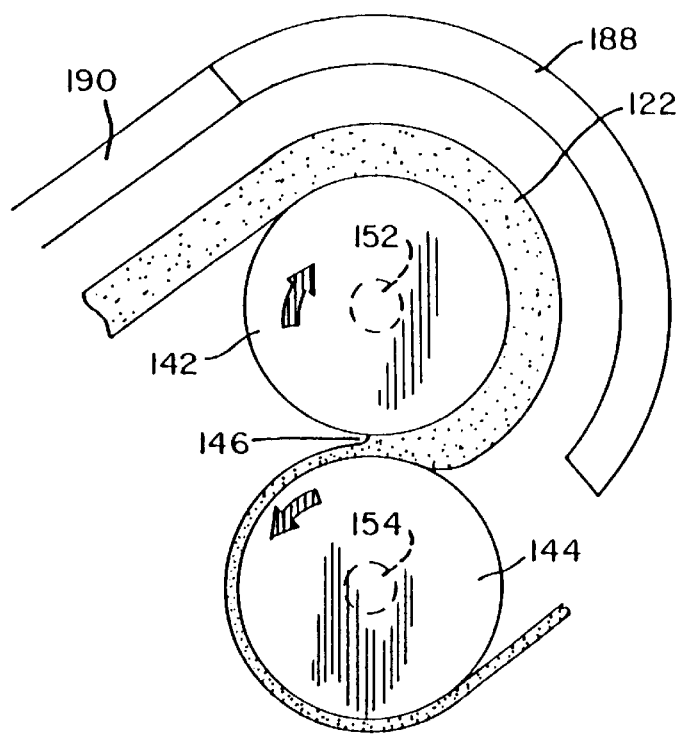
FIG. 6 is an enlarged, simplified, fragmentary front view, similar to that of FIG. 2, showing the milling and stretching rollers defining or comprising the zero-gap assembly of FIG. 1 and having the edge heaters operatively associated therewith.

With reference therefore again being made to FIG. 5, it is seen that in accordance with the principles of the present invention, and furthermore, in accordance with the foregoing discussion, the apparatus or system 100 has incorporated therein radiant, infrared heaters which are adapted to preheat the edge portions of the sheet workpiece 122 prior to its entry into the nip 146 defined between the upper and lower zero-gap assembly rollers 142 and 144. In particular, a pair of heaters 188 are effectively disposed with respect to the upper zero-gap assembly roller 142 so as to envelop the same for an arcuate or circumferential extent of 180°, and the heaters 188 are also axially disposed along the axis of the roller 142 so as to be optimally positioned with respect to the oppositely disposed edge portions of the sheet workpiece 122. Each one of the heaters 188 is approximately two and one-half inches (2.5") wide and is operated at 240 VAC with a generated power of 2500 Watts. In addition, a second pair of heaters 190, which are linear in configuration, are operatively connected to the upstream ends of the heaters 188, respectively, as viewed in the direction of travel of the sheet workpiece 122 toward the zero-gap assembly 120. These heaters 190 are similarly two and one-half inches (2.5") wide, however, they may only need to generate a power of 1900 Watts at 240 VAC. Still further, as yet an additional option or alternative, the sheet workpiece 122 may be initially pre-heated within the entry bridle assembly 132 by means of the disposition of additional heaters 192 which are similar to the heaters 188 in that they have the arcuate configuration enveloping, for example, the upper entry bridle assembly roller 138 over a circumferential extent of 180°, however, such heaters 192 need only generate 1500 Watts power at 240 VAC, but the heaters 192 are of the same width as that of heaters 188. The edge heaters 188 and 190 are also illustrated in FIG. 6.

As has been noted hereinbefore, while the aforenoted edge heaters 188 and 190 have in fact been instrumental in reducing the thickness dimensions of the sheet workpiece 122 at the extreme outer edge portions thereof, additional studies performed in connection with the strap profile and the effects upon the same by means of the disposition of the aforenoted edge heaters have revealed that concave portions or concavities are nevertheless still present within regions immediately adjacent to the extreme outer edge portions of the sheets. The concave portions have depth or thickness dimensions which are somewhat less than the thickness dimension characteristic of the main central portion of the milled and stretched sheet, and in addition, a transitional bump region is also present at the junction between the main central portion of the sheet and the concave side edge portions thereof. The transitional bump region has a thickness dimension which is greater than that of the main central portion of the sheet.

Consequently, in accordance with further developments attendant the production of oriented plastic strap, and particularly in accordance with the principles of the present invention, it has been determined that if additional heaters are disposed in a similar manner with respect to the sheet workpiece 122 as are the edge heaters 188, but disposed axially inwardly of the heaters 188 so a to be disposed toward the main central portion of the sheet work-piece 122, and in particular, disposed at axial positions along the sheet workpiece 122 corresponding to the transitional bump regions, the latter regions as well as the concave portions or concavities can be effectively eliminated or substantially reduced such that the thickness profile of the milled and stretched sheet 122 can be substantially more uniform across the entire widthwise extent thereof.

Figure 7:
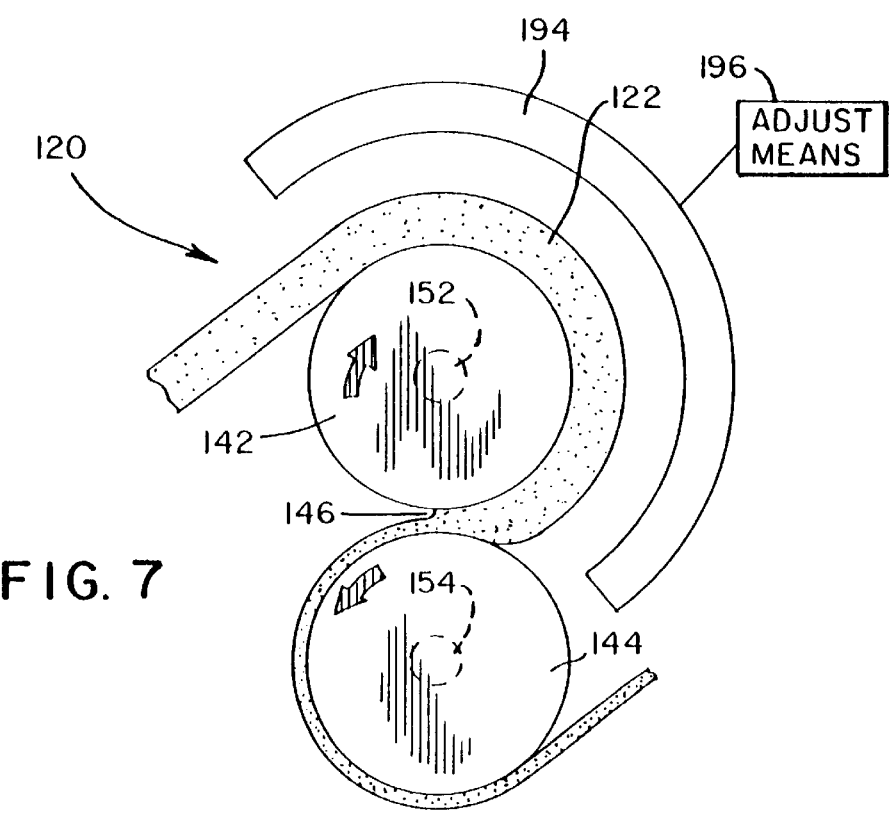
FIG. 7 is an enlarged, simplified, fragmentary front view, similar to that of FIG. 2, showing the milling and stretching rollers defining or comprising the zero-gap assembly of FIG. 1 and having the strip heaters of the present invention operatively associated therewith.

More particularly, and with reference being made to FIG. 9, a cross-sectional profile, in effect, is graphically illustrated in connection with a typical pilot milled and stretched sheet workpiece which has a width dimension of four and one-half inches (4.5"). The graphical data compiled and graphically illustrated in connection with the pilot workpiece accurately reflects similar data and profiles which would be replicated in connection with actual production sheet workpieces which have a width dimension of twenty-four inches (24") as noted hereinbefore. Continuing, therefore, as can be appreciated from graphically plotted curve A, which graphically illustrates or represents the profile of a milled and stretched sheet workpiece when neither the aforenoted edge heaters nor the additional strip heaters of the present invention were employed, the sheet workpiece profile is seen to comprise concave portions or concavities $A_c$ upon both edge portions of the sheet workpiece, and the concave portions are connected to the main central portion of the sheet workpiece through means of a pair of laterally spaced bump transition points $A_t$. It has been observed that the bump transition points $A_t$ occur at the one and one-quarter inch (1.25") and three and one-quarter inch (3.25") points along the width of the milled and stretched pilot sheet workpiece, and therefore in accordance with the present invention, strips heaters 194, as seen in FIGS. 7–9, are disposed about the entry roller 142 of the zero-gap assembly 120, in a manner similar to the disposition of the edge heaters 188, but at axial positions along the axial length of the sheet workpiece 122 which correspond to the axial locations of the bump transition points $A_t$, that is, axially inwardly of the edge heaters 188. The heaters 194 envelop the upper zero-gap assembly roller 142 over an arcuate or circumferential extent of 180°, and may comprise radiant infrared heaters similar to the edge heaters 188. The heaters 194 may also be adjustably disposed with respect to the sheet workpiece 112 by suitable adjusting means 196 so as to desirably or optimally vary the effects of such heaters 194 upon the sheet workpiece 122. The axial extent of the heaters 194 may also be suitably varied, and such spacing and axial length variations affect the width or axial length of the heated areas of of the workpiece whereby the infrared radiation can have increased or decreased distribution effects upon the sheet workpiece and in particular in connection with the bump transition points $A_t$ or regions. Curves B, C, and D graphically illustrate in FIG. 9 actual data corresponding to the various thickness profiles of milled and stretched sheet workpieces when heaters 194 having lengths of five-eighths of an inch (0.625"), one inch (1.0"), and one and one half inches (1.5"), respectively, were employed. It is to be further noted from the graph of FIG. 9 that for graphical comparison purposes, the effects of the strip heaters 194 have only been graphically illustrated upon the right side of the graphical profile whereby it can be seen that the profiles of the sheet workpieces have been rendered substantially flatter whereby the bump transition points and the concave portions or concavities have been substantially eliminated or significantly reduced. The reason for this phenomenon is due to be heating of the transitional bump regions, the resultant weakening of such regions with respect to the internal forces present within the workpieces and acting thereon as a result of the orientation process, and consequently, the transitional bump regions exhibit or undergo a reduction in their thickness dimensions while the portions of the workpieces disposed immediately adjacent to such transitional bump regions experience or undergo a corresponding enhancement in their thickness dimensions. Roller forces also impressed upon sheet workpieces likewise play a role in such thickness reduction and enhancement characteristics across the widths of the sheet workpieces. Comparison with the left side of the graph of FIG. 9, wherein the effects of the strip heaters 194 have not been illustrated, clearly disclose the presence of the bump transition points and the concavities or concave portions. Continuing still further, as additionally appreciated from the left side of the graph of FIG. 9, curve E represents an anticipated or typical sheet workpiece profile when only the edge heaters 188 and 190 would be employed. As can be seen, while the thickness dimension would be reduced, the sheet profile will still exhibit the bump transition point and the concavity or concave portion. Yet further, the curve ES represents an anticipated or typical sheet workpiece profile when both the edge and strip heaters would be employed. As can be appreciated, the bump transition point will be effectively eliminated, the concavity or concave portion will also be effectively eliminated, and the thickness dimension at the edge portion will be substantially reduced.

Thus, it may be seen that in accordance with the foregoing and particularly in accordance with the manufacturing techniques and apparatus developed in connection with the principles of the present invention, the finished milled and stretched sheet workpieces exhibit improved degrees or uniformity of flatness across the entire width dimension thereof whereby increased volumes of thermoplastic strapping may be produced or derived therefrom so as to render such manufacture more cost-effective.

Obviously, many modifications and variations of the present invention are possible in light of the above teachings. It is therefore to be understood that within the scope of the appended claims, the present invention may be practiced otherwise than as specifically described herein.

What is claimed as new and desired to be protected by means of Letters Patent of the Unites States of America, is:

1. A plastic strap made from a solid sheet of material having a predetermined original thickness dimension, comprising:

a solid sheet of material for engaging a first circumferential portion of a first one of a pair of opposed rollers which are spaced apart with respect to each other so as to define a nip therebetween which has a predetermined space dimension which is substantially less than said predetermined original thickness dimension of said solid sheet of material, wherein said pair of opposed rollers are rotated in opposite directions at different lineal surface velocities; for passing through said nip defined between said pair of opposed rollers so as to be simultaneously milled and stretched within said nip defined between said pair of opposed rollers; and for engaging a second circumferential portion of a second one of said pair of opposed rollers; and opposite heated side portions of said solid sheet of material disposed upstream of said nip defined between said pair of opposed rollers and at axial positions across the width of said solid sheet of material which are located predetermined distances axially inwardly from opposite side edge portions of said solid sheet of material so as to increase the degree of flatness of said simultaneously milled and stretched solid sheet of material across said width of said simultaneously milled and stretched solid sheet of material after said simultaneously milled and stretched solid sheet of material has passed through said nip defined between said pair of opposed rollers by eliminating any concave portions and bump transitional points defined between said concave portions and a main central portion of said solid sheet of material which tend to form at and within the vicinity of said axial positions located at said predetermined distances from said opposite side edge portions of said solid sheet of material.

2. The strap as set forth in claim 1, further comprising:

said opposite side edge portions of said solid sheet of material are also heated and are disposed upstream of said nip defined between said pair of opposed rollers so as to cooperate with said heated opposite side portions of said solid sheet of material so as to achieve said degree of flatness of said simultaneously milled and stretched solid sheet of material across said width of said simultaneously milled and stretched solid sheet of material.

3. The strap as set forth in claim 1, wherein:

said predetermined distances from said opposite side edge portions of said solid sheet of material are approximately one and one-quarter inches (1.25").

4. The strap as set forth in claim 1, wherein:

said solid sheet of material comprises polypropylene.

5. The strap as set forth in claim 1, wherein:

said solid sheet of material comprises polyester.

6. The strap as set forth in claim 5, wherein:

said polyester comprises polyethylene terephthalate.

* * * * *